Aug. 20, 1968  R. C. GROVES  3,397,621
VACUUM MODULATOR
Filed Oct. 14, 1965
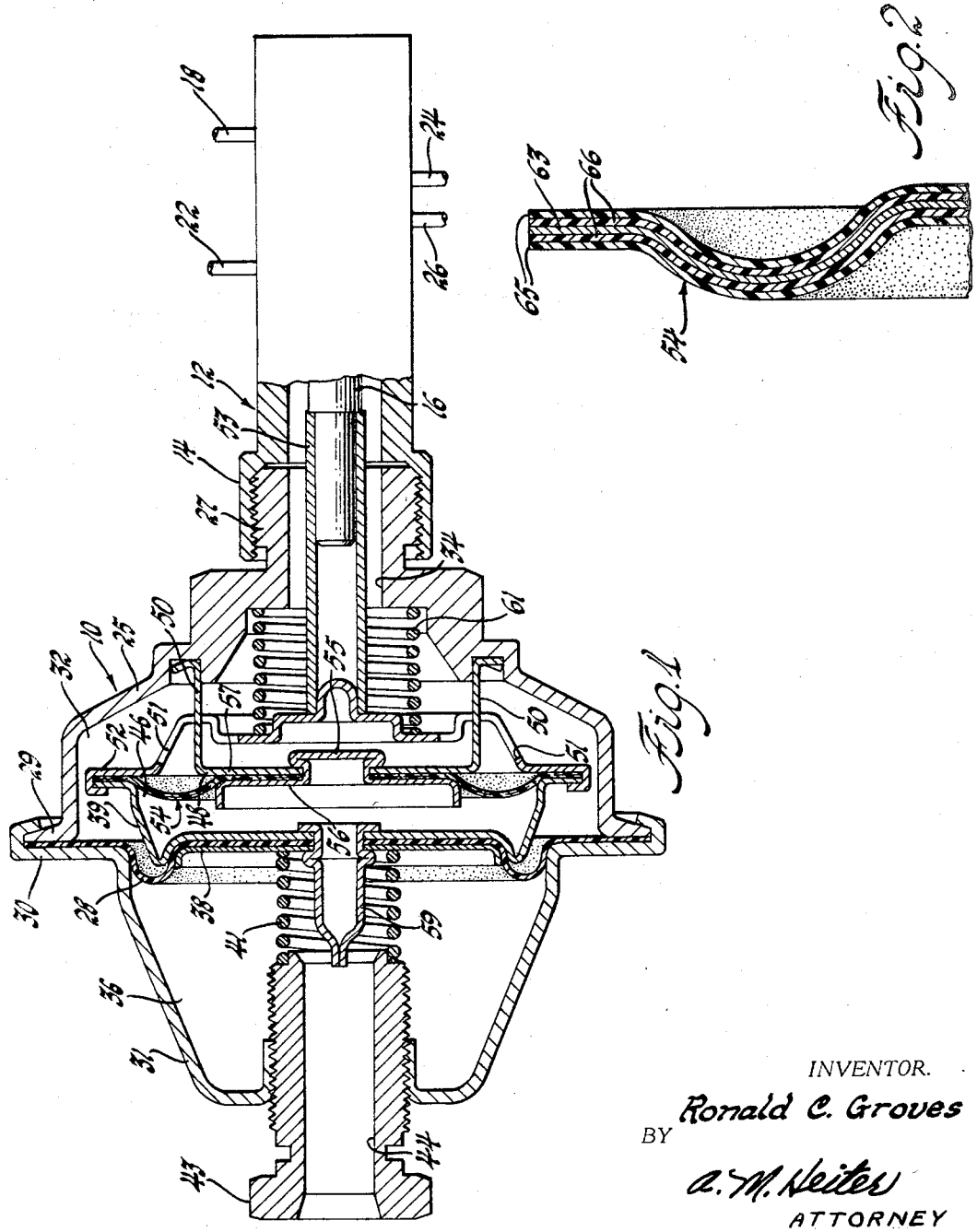
INVENTOR.
Ronald C. Groves
BY
*a. M. Neiter*
ATTORNEY

United States Patent Office 3,397,621
Patented Aug. 20, 1968

3,397,621
VACUUM MODULATOR
Ronald C. Groves, Rochester, N.Y., assignor to General Motors Corporation, Detroit, Mich., a corporation of Delaware
Filed Oct. 14, 1965, Ser. No. 496,117
6 Claims. (Cl. 92—48)

ABSTRACT OF THE DISCLOSURE

A vacuum modulator for use in automatic transmission control systems, the modulator having a gas impervious diaphragm comprising a metallic foil reinforced by polyester film for sealingly closing a chamber which is evacuated. The evacuated chamber cooperates with a second diaphragm acted on by the pressure differential between atmospheric pressure and engine vacuum to provide a net effective biasing force which varies as a function of engine vacuum and is corrected for varying atmospheric pressure. A cup-shaped member comprising part of the modulator's output force transmitter in addition to securing the diaphragms together cooperates with the gas impervious diaphragm to provide the evacuated chamber.

---

This invention relates to vacuum modulators and more particularly to ambient atmospheric pressure compensated, diaphragm type vacuum modulators particularly adapted for use in automatic transmission control systems.

Altitude compensated vacuum modulators are commonly used in automatic transmission control systems to provide a regulated line pressure which is varied in proportion to engine torque as a function of engine intake manifold vacuum which is corrected for changes in manifold vacuum resulting from varying ambient atmospheric pressure. The modulating action produced maintains a normal range of system pressure for a given torque and vehicle speed range irrespective of the varying ambient atmospheric pressure encountered during vehicle operation. While the altitude compensated vacuum modulators of the prior art have generally proven satisfactory, they often do not meet the required standards of commercialization tailored to large volume, low unit cost production. One of the reasons for this problem centers on the use of an evacuated, metallic bellows, the use of rubber diaphragms to provide the vacuum chamber having been found generally unsatisfactory since the diaphragms were not sufficiently impervious to gas diffusion.

The vacuum modulator of this invention is of the diaphragm type but has the gas impervious characteristics of the bellows type and is illustrated in the preferred embodiment as employing a housing which receives a centrally-mounted diaphragm separating the housing into two chambers with one chamber being for connection to a manifold vacuum pressure source such as an engine intake manifold and the other chamber for connection with the atmosphere. A cup-shaped member attached to this diaphragm has a second diaphragm attached about the periphery of the open end which second diaphragm forms, with the aid of the cup-shaped member, a sealed chamber which is evacuated and located within the atmospheric pressure chamber. The second diaphragm is made gas impervious by employing a laminate structure which has a thin sheet of metal foil sandwiched between layers of Mylar, Videne or other suitable polyester film. The central portion of the gas impervious diaphragm is rigidly attached to the housing so that during expansion and retraction of the evacuated chamber, the cup-shaped member is moved. The cup-shaped member acts through a force transmitting member to transmit the biasing force of the vacuum modulator thus provided to a valve such as a transmission modulator valve. Opposed springs act between the housing and the cup-shaped member so as to locate and balance the movable diaphragm assemblies, the spring on the engine vacuum side of the assembly being seated against a threaded fitting in the housing to provide a fine adjustment for unit calibration.

An object of this invention is to provide a vacuum modulator employing a single gas impervious diaphragm for sealing and closing an evacuated chamber which chamber is for cooperating with a second diaphragm acted on by the pressure differential between ambient atmospheric pressure and a variable vacuum source to provide a net effective biasing force which varies as a function of the vacuum pressure as corrected for varying ambient atmospheric pressure.

Another object of this invention is to provide a vacuum modulator constructed so that a single gas impervious diaphragm closes an evacuated chamber from ambient atmospheric pressure which chamber together with a second diaphragm acted on by the pressure differential between ambient atmospheric pressure and a variable vacuum source provides a net effective output biasing force which varies as a function of the variable vacuum source and is corrected for changes in ambient atmospheric pressure.

Another object of this invention is to provide a vacuum modulator for controlling an axially movable force transmitting member employing first motor means for biasing the force transmitting member in one direction having a sealed and evacuated chamber grounded to the modulator housing provided with an expandable gas impervious diaphragm exposed to ambient atmospheric pressure and second motor means for biasing the force transmitting member in the one direction with a smaller biasing force employing a second diaphragm exposed to ambient atmospheric pressure on one side and a variable vacuum pressure source on the other side so that the force transmitting member is acted on by an effective biasing force which is the combination of the biasing forces of the first and second motor means and acts in the one direction and is reflective of changes in vacuum pressure and ambient atmospheric pressure.

Another object of this invention is to provide an ambient atmospheric pressure compensated vacuum modulator for controlling a valve having a housing separated into two chambers by a diaphragm which is exposed on one side to engine manifold vacuum pressure and on the other side to ambient atmospheric pressure and further having a second diaphragm attached by a rigid member to the first diaphragm and cooperating with the rigid member to form a sealed and evacuated chamber exposed exteriorly to ambient atmospheric pressure with the rigid member being connected by a force transmitting member to the valve so as to transmit a biasing force for acting on the valve which is reflective of changes in the variable vacuum source and ambient atmospheric pressure.

These and other objects of the invention will be more apparent from the following description and drawing of the preferred embodiment of the invention in which:

FIGURE 1 is a longitudinal sectional view through a vacuum modulator shown to be adapted to control a transmission control valve, the modulator being constructed in accordance with the principles of this invention.

FIGURE 2 is an enlarged view showing a portion of the gas impervious diaphragm which closes and seals the evacuated chamber shown in FIGURE 1.

Referring to FIGURE 1, the vacuum modulator, indicated generally at 10, is shown as being adapted to control a modulator valve for a vehicle's automatic transmission control system, indicated generally at 12, which valve has a valve body 14 having a bore in which a movable valve member 16 is mounted for reciprocal movement. The valve 12 is of the type shown in copending application Ser. No. 306,886, filed Sept. 5, 1963 of Ronald C. Groves entitled "Transmission Control," now Patent No. 3,295,388, and therefore its structural detail and operation need not be discussed in detail here, it being sufficient to know that passage 18 contains a fluid having a regulated pressure and acts as a main line for the control system including this valve. Passage 22 contains a fluid having a governed pressure which increases with vehicle speed and passage 24 receives fluid from the main line whose pressure has been modulated by this valve and passage 26 serves as exhaust for the valve. Furthermore, when valve member 16 is urged rightwardly by the output biasing force from the modulator 10, this rightward modulator biasing force is resisted by the variable governor pressure and main line pressure and operates to increase the modulator or throttle valve pressure delivered to passage 24 with increasing modulator biasing force.

Describing the vacuum modulator structure, the casing or housing is formed in two parts. One part, a base 25, has an integral and apertured projection 27 which is secured in the left-hand end of the valve bore in valve body 14. A rubber diaphragm 28 is sandwiched between the flange 29 of base 25 and an opposed flange 30 formed on a closure cap 31 and crimped over flange 29. Diaphragm 28 separates the housing interior into two chambers, namely, an atmospheric pressure chamber 32 and a vacuum chamber 36, the chamber 32 being exposed to the atmosphere via passage 34 and the valve body in the transmission. A diaphragm protector, which is the cup-shaped member 38, and a diaphragm connector, which is the cup-shaped member 39, sandwich the central portion of the diaphragm 28 and there is provided a calibrating spring 41 seated on the protector 38 and a threaded fitting 43 which is screwed in cap 31. Spring 41 urges the diaphragm 28 rightwardly and fitting 43 can be advanced or retracted for fine adjustment of the biasing force. Fitting 43 also has a central aperture 44 which is for connecting the chamber 36 to an engine intake manifold, not shown, by a hose and the proper mating fitting.

Located within the atmospheric chamber 32 is an evacuated and sealed chamber 46 whose structural assembly includes a fixed support member 48 having a base plate 57 and circumferentially spaced legs 50 whose feet are fixed to base 25 by wedgably engaging in a channel in base 25, the legs passing freely through openings 51 provided in a connector member 52. A sleeve 53 connects member 52 and valve member 16. A diaphragm 54, whose structure is described in greater detail later, is clamped between protector cup 56 and base plate 57 which are secured together by a button rivet 55 on the protector cup 56 extending through an aperture in the diaphragm and base plate 57. The outer peripheral edge of member 52 is flanged to sealingly secure diaphragm 54 to member 39. The member 39 and diaphragm 54 cooperate to provide the sealed and evacuated chamber which is evacuated at assembly through a sealable nipple 59 which nipple is crimped to connect members 38 and 39.

Between base 25 and member 52 is a spring 61 providing a leftwardly acting biasing force considerably greater than the rightwardly acting calibrating biasing force provided by calibrating spring 41 and these forces together with vacuum forces and transmission pressure forces will balance the diaphragm assemblies in a mean position.

It is important that the vacuum established in chamber 46 be preserved or maintained so that the reference thus provided is maintained constant to provide accurate and reliable modulator operation. This is successfully accomplished as best shown in FIGURE 2 by having the diaphragm comprise essentially a metal foil 63 reinforced on each side by a suitable tough, flexible coating 65. Applicant has found that Mylar and Videne, which are thermoplastic polyester resin films, are especially suited for the coating, the film being secured to the metal foil by a standard adhesive 66.

Describing now the operation of the modulator and its relation to the modulator valve 12 for which it has been adapted, the net effective output force of the modulator is reflective of the torque load on the engine as a function of intake manifold vacuum and is corrected for changes in intake manifold vacuum resulting from changes in ambient atmospheric pressure. This net effective output force of the modulator always acts rightwardly on the sleeve 53 to bias the valve element 16 rightwardly against governor pressure and line pressure. Ambient atmospheric pressure in chambers 32 and 36, which pressure will be assumed at this point to remain constant in the environment in which the vehicle is being operated, compresses the evacuated chamber 46 and this force is transmitted by members 39, 52 and sleeve 53 to provide a primary and major biasing force for modulator valve control. Spring 61 resists compression of chamber 46 and thus this spring decreases or subtracts from the rightward biasing force resulting from ambient atmospheric pressure acting on diaphragm 54. Ambient atmospheric pressure also acts on the exposed right-hand side of diaphragm 28 and when high manifold vacuum (large negative pressure) acts on the opposite or left-hand side of this diaphragm, such as occurs when the engine is idling, the net result of these pressures acting on the diaphragm 28 is to provide a leftward biasing force acting on members 39 and 52 which force is a maximum under these conditions. The leftward biasing force provided by diaphragm 28 due to reduction of ambient atmospheric pressure by connection of vacuum to chamber 36, like the leftward acting spring bias of spring 61, subtracts from the rightward biasing force resulting from atmospheric pressure acting on diaphragm 54. The calibrating spring 41 provides a small, rightward biasing force resisting leftward movements of diaphragm 28 and thus subtracts from the leftward pressure force acting on diaphragm 28. The net result of all these biasing forces transmitted by sleeve 53 to valve member 16 is a rightward biasing force at this constant atmospheric pressure which is reflective of engine torque load as a function of intake manifold vacuum and which tends to cause valve 12 to produce a minimum modulated pressure in passage 24 when intake manifold vacuum is high such as when the engine is idling.

The calibration for finally setting the modulator at a gage point is accomplished by adjustment of fitting 43 to either increase or decrease the rightward acting biasing force provided by the calibrating spring 41, this spring force being considerably smaller than that of spring 61.

With the ambient atmospheric pressure still remaining constant, when lower manifold vacuum (smaller negative pressure approaching atmospheric pressure) acts on the left-hand side of diaphragm 28, such as occurs with a full torque load on the engine, the net result of the pressures acting on the diaphragm 28 produces a decreased leftwardly acting force which is a minimum at this constant ambient atmospheric pressure and lowest manifold vacuum. Since intake manifold vacuum is the only parameter of modulator 10 which has changed, the next effective output force of the modulator has increased which increased force tends to increase modulator pressure to aid in controlling the timing of transmission shifts, for example. It will also be recognized that governor pressure will increase with vehicle speed and reduce the increase in modulator pressure in opposition to modulator bias.

Considering the compensation for changes in ambient atmospheric pressure when such pressure decreases, such as with respect to the previously constant ambient atmospheric pressure, this reduced ambient atmospheric pressure acting on diaphragm 54 results in expansion of chamber 46. As chamber 46 expands, the preponderantly rightwardly acting output force is reduced because of the smaller differential pressure acting on diaphragm 54. This results in reduction of the rightwardly acting net effective output force of the modulator which causes the modulator valve to modulate at a lower pressure. Conversely, on an increase in ambient atmospheric pressure relative to the aforementioned constant ambient atmospheric pressure, there occurs a larger differential pressure acting on diaprhagm 54 which results in an increased rightwardly acting output force. This increased output force increases the net effective output force of the modulator and causes the modulator valve to modulate at a higher pressure. It will also be recognized at this point that the effective reaction area of the diaphragm 28 determines the relationship of modulator load to the force transmitted to valve 12. The effective reaction area of diaphragm 54 is smaller than that of diaphragm 28 in this application of the modulator so that the valve load decreases with increasing altitude to provide the proper transmission control pressure. In other applications where increasing valve load with increasing altitude is desired, the diaphragm 54 is made larger than diaphragm 28. If it is desired to maintain the valve load constant with altitude changes, the diaphragms 54 and 28 are made the same size.

Thus, there has been provided a simply constructed, ambient atmospheric pressure compensated, diaphragm type vacuum modulator which employs one diaphragm responsive to the pressure differential of ambient atmospheric pressure and engine manifold vacuum and a second diaphragm which is gas impervious and closes and seals an evacuated chamber to maintain a constant reference. With the two motors thus provided, whose arrangement is for maximum compactness, there is produced a simple and efficient modulator capable of producing a net effective output biasing force which increases with decreasing vacuum and increasing ambient atmospheric pressure and conversely, decreases with increasing vacuum and decreasing ambient atmospheric pressure.

The above-described preferred embodiment is illustrative of the invention which may be modified by those skilled in the art within the scope of the appended claims.

I claim:

1. In an ambient atmospheric pressure compensated vacuum modulator for a transmission control system valve for an engine driven vehicle the combination of:
  (a) a housing, a force transmitting means mounted for reciprocal movement in said housing and having an output member for connection to a valve,
  (b) a first diaphragm mounted in said housing and separating said housing into a first chamber for connection to the engine intake manifold and a second chamber for exposure to the atmosphere, a diaphragm connector connecting said first diaphragm to said force transmitting means,
  (c) reference chamber means mounted in said second chamber and including a second diaphragm having one portion fixed to said housing and another portion operatively connected to said force transmitting means for cooperating with said diaphragm connector independently of said first diaphragm and said housing to provide a sealed and evacuated chamber, said second diaphragm being acted on by atmospheric pressure and the sealed vacuum to provide one biasing force acting in one direction on said force transmitting means,
  (d) and said first diaphragm being responsive to the difference in pressure betwen atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure, 2. In an ambient atmospheric pressure compensated vacuum modulator for a transmission control system valve for an engine driven vehicle the combination of:
  (a) a housing, a force transmitting means mounted for reciprocal movement in said housing and having an output member for connection to a valve,
  (b) a first diaphragm mounted in said housing and separating said housing into a first chamber for connection to the engine intake manifold and a second chamber for exposure to the atmosphere, a diaphragm protector and a diaphragm connector clamping said first diaphragm, said diaphragm connector connecting said first diaphragm to said force transmitting means,
  (c) reference chamber means mounted in said second chamber and including a second diaphragm having one portion fixed to said housing and another portion operatively connected to said force transmitting means for cooperating with said diaphragm connector independently of said first diaphragm and said housing to provide a sealed and evacuated chamber, said second diaphragm being acted on by atmospheric pressure and the sealed vacuum to provide one biasing force acting in one direction on said force transmitting means.
  (d) a spring arranged between said force transmitting means and said housing for biasing said force transmitting means in the opposite direction,
  (e) and said first diaphragm being responsive to the difference in pressure between atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure.

3. In an ambient atmospheric pressure compensated vacuum modulator for a transmission control system valve for an engine driven vehicle the combination of:
  (a) a housing, a force transmitting means mounted for reciprocal movement in said housing and having an output member for connection to a valve,
  (b) a first diaphragm mounted in said housing and separating said housing into a first chamber for connection to the engine intake manifold and a second chamber for exposure to the atmosphere, a diaphragm protector and a diaphragm connector clamping said first diaphragm, said diaphragm connector connecting said first diaphragm to said force transmitting means,
  (c) reference chamber means mounted in said second chamber and including a second diaphragm having one portion fixed to said housing and another portion operatively connected to said force transmitting means for cooperating with said diaphragm connector independently of said first diaphragm and said housing to provide a sealed and evacuated chamber, said second diaphragm being acted on by atmospheric pressure and the sealed vacuum to provide one biasing force acting in one direction on said force transmitting means,
  (d) said first diaphragm being responsive to the difference in pressure between atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure,
  (e) and calibrating means for calibrating the net effective biasing force including a spring arranged between said diaphragm protector and said housing for biasing said force transmitting means in said one direction and an adjustable member for adjusting the bias of said spring.

4. In an ambient atmospheric pressure compensated vacuum modulator for a transmission control system valve for an engine driven vehicle the combination of:
   (a) a housing, a force transmitting means mounted for reciprocal movement in said housing and having an output member for connection to a valve,
   (b) a first diaphragm mounted in said housing and separating said housing into a first chamber for connection to the engine intake manifold and a second chamber for exposure to the atmosphere,
   (c) reference chamber means mounted in said second chamber and including a second diaphragm having one portion fixed to said housing and another portion operatively connected to said force transmitting means for cooperating with said force transmitting means independently of said first diaphragm and said housing to provide a sealed and evacuated chamber, said force transmitting means including a cup-shaped member for securing said first diaphragm and said second diaphragm to said output member and for cooperating with said second diaphragm to provide said sealed and evacuated chamber,
   said second diaphragm being acted on by atmospheric pressure and the sealed vacuum to provide one biasing force acting in one direction on said force transmitting means,
   (d) and said first diaphragm being responsive to the difference in pressure between atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure.

5. In an ambient atmospheric pressure compensated vacuum modulator for a transmission control system valve for an engine driven vehicle the combination of:
   (a) a housing, a force transmitting means mounted for reciprocal movement in said housing and having an output member for connection to a valve,
   (b) a first diaphragm mounted in said housing and separating said housing into a first chamber for connection to the engine intake manifold and a second chamber for exposure to the atmosphere, a diaphragm protector and a diaphragm connector clamping said first diaphragm, said diaphragm connector connecting said first diaphragm to said force transmitting means,
   (c) reference chamber means mounted in said second chamber and including a second diaphragm comprising a metal foil reinforced by polyester film having one portion fixed to said housing and another portion operatively connected to said diaphragm connector for cooperating with said diaphragm connector independently of said first diaphragm and said housing to provide a sealed and evacuated chamber, said second diaphragm being acted on by atmospheric pressure and the sealed vacuum to provide one biasing force acting in one direction on said force transmitting means,
   (d) and said first diaphragm being responsive to the difference in pressure between atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure.

6. In an ambient atmospheric pressure compensated vacuum modulator for a transmission control system valve for an engine driven vehicle the combination of:
   (a) a housing, a force transmitting means mounted for reciprocal movement in said housing and having an output member for connection to a valve,
   (b) a first diaphragm mounted in said housing and separating said housing into a first chamber for connection to the engine intake manifold and a second chamber for exposure to the atmosphere,
   (c) reference chamber means mounted in said second chamber and including a second diaphragm comprising a metal foil reinforced by polyester film having one portion fixed to said housing and another portion operatively connected to said force transmitting means for cooperating with said force transmitting means independently of said first diaphragm and said housing to provide a sealed and evacuated chamber; said force transmitting means including a cup-shaped member for securing said first diaphragm and said second diaphragm to said output member and for cooperating with said second diaphragm to provide said sealed and evacuated chamber, said second diaphragm being acted on by atmospheric pressure and the sealed vacuum to provide one biasing force acting in one direction on said force transmitting means,
   (d) a spring arranged between said force transmitting means and said housing for biasing said force transmitting means in said opposite direction,
   (e) said first diaphragm being responsive to the difference in pressure between atmospheric pressure and engine vacuum to provide another biasing force smaller than said one biasing force acting in the opposite direction on said force transmitting means whereby the combined biasing forces provide a net effective biasing force acting in said one direction which is reflective of engine torque as a function of engine vacuum and is corrected for changes in engine vacuum resulting from changes in ambient atmospheric pressure,
   (f) and calibrating means for calibrating the net effective biasing force including a spring arranged between said first diaphragm and said housing for biasing said force transmitting means in said one direction and an adjustable member for adjusting the bias of said spring.

References Cited

UNITED STATES PATENTS

| | | | |
|---|---|---|---|
| 862,867 | 8/1907 | Eggleston | 92—100 X |
| 2,654,995 | 10/1953 | Ostroff | 92—49 X |
| 2,672,890 | 3/1954 | Bales | 92—135 X |
| 2,899,948 | 8/1959 | Groves | 123—140.3 X |
| 2,902,048 | 9/1959 | Ryan | 92—103 X |
| 2,936,785 | 5/1960 | Hastings | 92—49 |
| 3,049,931 | 8/1962 | Lang et al. | 92—103 X |
| 3,106,104 | 10/1963 | Harry | 74—472.1 |
| 3,128,751 | 4/1964 | Dahl et al. | 92—48 X |
| 3,295,388 | 1/1967 | Groves | 74—472.1 |
| 3,302,534 | 2/1967 | Bauer et al. | 92—36 |

MARTIN P. SCHWADRON, *Primary Examiner.*

I. C. COHEN, *Assistant Examiner.*